(12) United States Patent
Chung et al.

(10) Patent No.: US 12,325,803 B2
(45) Date of Patent: Jun. 10, 2025

(54) INVISIBLE INK AND METHOD OF MAKING THE SAME

(71) Applicant: NATIONAL CHENG KUNG UNIVERSITY, Tainan (TW)

(72) Inventors: Chen-Kuei Chung, Tainan (TW); Chung-Yu Yu, Tainan (TW); Chin-An Ku, Tainan (TW)

(73) Assignee: National Cheng Kung University, Tainan (TW)

( * ) Notice: Subject to any disclaimer, the term of this patent is extended or adjusted under 35 U.S.C. 154(b) by 247 days.

(21) Appl. No.: 17/702,973

(22) Filed: Mar. 24, 2022

(65) Prior Publication Data

US 2023/0303879 A1 Sep. 28, 2023

(51) Int. Cl.
*C09D 11/50* (2014.01)
*C09D 1/00* (2006.01)
*C25D 11/04* (2006.01)

(52) U.S. Cl.
CPC ............. *C09D 11/50* (2013.01); *C09D 1/00* (2013.01); *C25D 11/04* (2013.01)

(58) Field of Classification Search
CPC ........ C09D 11/50; C09D 1/00; C09D 11/037; C25D 11/04
See application file for complete search history.

(56) References Cited

U.S. PATENT DOCUMENTS

2010/0194836 A1* 8/2010 Prolss .................. C09C 1/64
106/31.86

FOREIGN PATENT DOCUMENTS

| CN | 102492331 A | * | 6/2012 |
| CN | 111607295 A | | 9/2020 |
| CN | 112210248 A | | 1/2021 |
| EP | 0319953 A2 | * | 6/1989 |
| JP | H10251570 A | * | 9/1998 |
| KR | 20060085074 A | * | 7/2006 |

OTHER PUBLICATIONS

Xifre-Perez et al. "Micro- and nanoparticles of mesoporous anodic alumina: Morphological and physicochemical properties" in Microporous and Mesoporous Materials, vol. 239, Oct. 2016, pp. 363-370 (Year: 2016).*

English translation of Kinoshita et al. JP H10251570 A (Year: 1998).*

(Continued)

*Primary Examiner* — Jennifer A Smith
*Assistant Examiner* — Jeffrey Eugene Barzach
(74) *Attorney, Agent, or Firm* — Rosenberg, Klein & Lee

(57) ABSTRACT

An invisible ink and a method of making the same are revealed. The invisible ink includes anodic aluminum oxide (AAO) powder and at least one solvent. The method of making the invisible ink includes the steps of taking an aluminum substrate and carrying out anodic oxidation on the aluminum substrate at least once to form an anodic aluminum oxide (AAO) layer on a surface of the aluminum substrate, separating the AAO layer from the aluminum substrate and pulverizing the separated AAO layer to get AAO powder, and adding the AAO powder into a solvent to obtain the invisible ink.

6 Claims, 3 Drawing Sheets

(56) References Cited

OTHER PUBLICATIONS

Chen et al. "An environment-friendly electrochemical detachment method for porous anodic alumina" in Journal of Electroanalytical Chemistry, vol. 600, Feb. 2007, pp. 257-264 (Year: 2007).*
National Center for Biotechnology Information PubChem Compound Summary for CID 702, Ethanol, pp. 20-21 (Year: 2024).*
National Center for Biotechnology Information PubChem Compound Summary for CID 24247, Perchloric Acid, pp. 13-14 (Year: 2024).*
Brudzisz, Anna, et al. "Through-hole AAO-sa templates with a small pore diameter prepared by the Voltage Pulse Detachment Method." Microporous and Mesoporous Materials, vol. 283, Jul. 15, 2019, pp. 73-81, https://doi.org/10.1016/j.micromeso.2019.03.052. (Year: 2019).*
Xifre-Perez, Elisabet, et al. "Micro- and nanoparticles of mesoporous anodic alumina: Morphological and physicochemical properties." Microporous and Mesoporous Materials, vol. 239, Feb. 2017, pp. 363-370, https://doi.org/10.1016/j.micromeso.2016.10.034. (Year: 2017).*
English machine translation of KR-20060085074-A (Year: 2006).*
English machine translation of CN-102492331-A (Year: 2012).*
Chung, C K, et al. "Hybrid pulse anodization for the fabrication of porous anodic alumina films from commercial purity (99%) aluminum at room temperature." Nanotechnology, vol. 20, No. 5, Jan. 9, 2009, p. 055301, https://doi.org/10.1088/0957-4484/20/5/055301 (Year: 2009).*

\* cited by examiner

INVISIBLE INK AND METHOD OF MAKING THE SAME

BACKGROUND OF THE INVENTION

Field of the Invention

The present invention relates to an invisible ink and a method of making the same, especially to an invisible ink composed of anodic aluminum powder and at least one solvent, and a method of making the same.

Description of Related Art

An invisible ink or pigment is colorless and invisible under visible light until but visible under specific conditions such as UV radiation. Thus words and figures which are written and drawn respectively by the invisible ink or pigment are normally unable to be seen but only becoming visible under certain conditions.

An invisible ink available now is made from luminescent materials which are divided into organic luminescent materials and inorganic luminescent materials. Refer to Chinese Pat. Pub. No. CN 112210248(A), a water-based fluorescent ink which emits fluorescence only under UV radiation is revealed. A luminescent material used in the ink is poly(9, 9-dioctylfluorene) (PFO) or poly(9,9-dioctylfluorenyl-2,7-diyl). Refer to Chinese Pat. Pub. No. CN 111607295(A), water-based fluorescent color paste for an invisible anti-counterfeiting two-dimensional code is disclosed. The phosphors used are calcium sulfides doped with rare earth elements, inorganic luminescent materials, such as CaS:Eu2, CaS:Ce3, CaS:EuDyCaS3, CaS:Dy3, and CaS:CeEu2.

However, the organic luminescent materials are easy to decompose or fade under high temperature or after long term illumination due to their poor stability. A plurality of solvents are used during production of the organic luminescent materials and this causes environmental pollution. As to the inorganic luminescent materials, most of them contain rare earth elements such as lanthanides. The rare earth elements have low yield which makes them very expensive and the production cost of the inorganic luminescent materials is significantly increased. Thus there is room for improvement and there is a need to provide an invisible ink with high stability but low cost.

SUMMARY OF THE INVENTION

Therefore, it is a primary object of the present invention to provide an invisible ink and a method of making the same which address the issues mentioned above.

In order to achieve the above object, an invisible ink according to the present invention includes anodic aluminum oxide (AAO) powder ranging from 0.0001 to 20 wt % (percentage by weight) and the rest are solvents. A method of making an invisible ink according to the present invention includes the following steps. Step 1: taking an aluminum substrate and carrying out an anodic oxidation process on the aluminum substrate at least once to form an anodic aluminum oxide (AAO) layer on a surface of the aluminum substrate. Step 2: separating the anodic aluminum oxide layer from the aluminum substrate and pulverizing the separated anodic aluminum oxide layer to get anodic aluminum oxide powder. Step 3: adding the anodic aluminum oxide powder into a solvent to obtain the invisible ink.

Preferably, in the anodic oxidation process of the step one, the aluminum substrate is placed into an acidic solution and applied with a voltage ranging from 5 to 200 V (volt) at −3 to 35 degrees Celsius (t) for 3 min to 120 hours to form the anodic aluminum oxide layer on the surface of the aluminum substrate. The acidic solution includes oxalic acid solution, phosphoric acid solution, sulfuric acid solution, and their combinations.

Preferably, in the anodic oxidation of the step one, the aluminum substrate is placed into a 0.001 to 3 M sulfuric acidic solution and applied with a voltage of 5 to 50 V, and wherein the acidic solution is acid solution Preferably, in the anodic oxidation of the step one, the aluminum substrate is placed into a 0.1 to 1.5 M oxalic acidic solution and applied with a voltage of 20V to 150 V, and wherein the acidic solution is acid solution.

Preferably, in the anodic oxidation of the step one, the aluminum substrate is placed into a 0.1 to 20 wt % phosphoric acidic solution and applied with a voltage of 100 to 200 V.

Preferably, the AAO powder has a particle diameter ranging from 0.01 to 100 micrometer (μm).

More preferably, the AAO powder has a particle diameter ranging from 0.01 to 5 micrometer (μm).

Further preferably, the AAO powder has a particle diameter ranging from 1 to 5 micrometer (μm).

Preferably, the solvent includes silicone oil and dispersants.

Preferably, in the step two, the aluminum substrate with the anodic aluminum oxide layer is placed into a mixed solution of perchloric acid and ethanol or in a perchloric acid aqueous solution, and applied with a specific voltage for stripping the anodic aluminum oxide layer from the aluminum substrate.

Preferably, the ratio of the perchloric acid and ethanol is 8:1-1:8 in the mixed solution of perchloric acid and ethanol Preferably, the ratio of the perchloric acid and water is 8:1 to 1:8 in the perchlorate acid aqueous solution.

Preferably, the specific voltage used in the step two is 1.1 to 1.5 times of the voltage used in the anodic oxidation process of the step one.

Preferably, the aluminum substrate comprises high purity aluminum (purity higher than 99.9%), low purity aluminum (purity lower than 99.5%), 5052 aluminum alloy or 6061 aluminum alloy.

Thereby the invisible ink of the present invention uses anodic aluminum oxide (AAO) as luminescent material which is having stable luminescence properties and unable to change the luminescent intensity and characteristics easily due to the environment. Moreover, the AAO powder in the present invisible ink will not aggregate into clumps easily so that precipitation will not occur easily in the invisible ink produced.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn features and functions of the present invention, please refer to the following embodiments with reference with figures.

An invisible ink and a method of making the same are provided. The invisible ink includes anodic aluminum oxide (AAO) powder ranging from 0.0001% to 20% by weight (wt %) and the rest are solvents. In a preferred embodiment, the invisible ink includes 1000 to 1500 ppm AAO powder.

Figure 1:
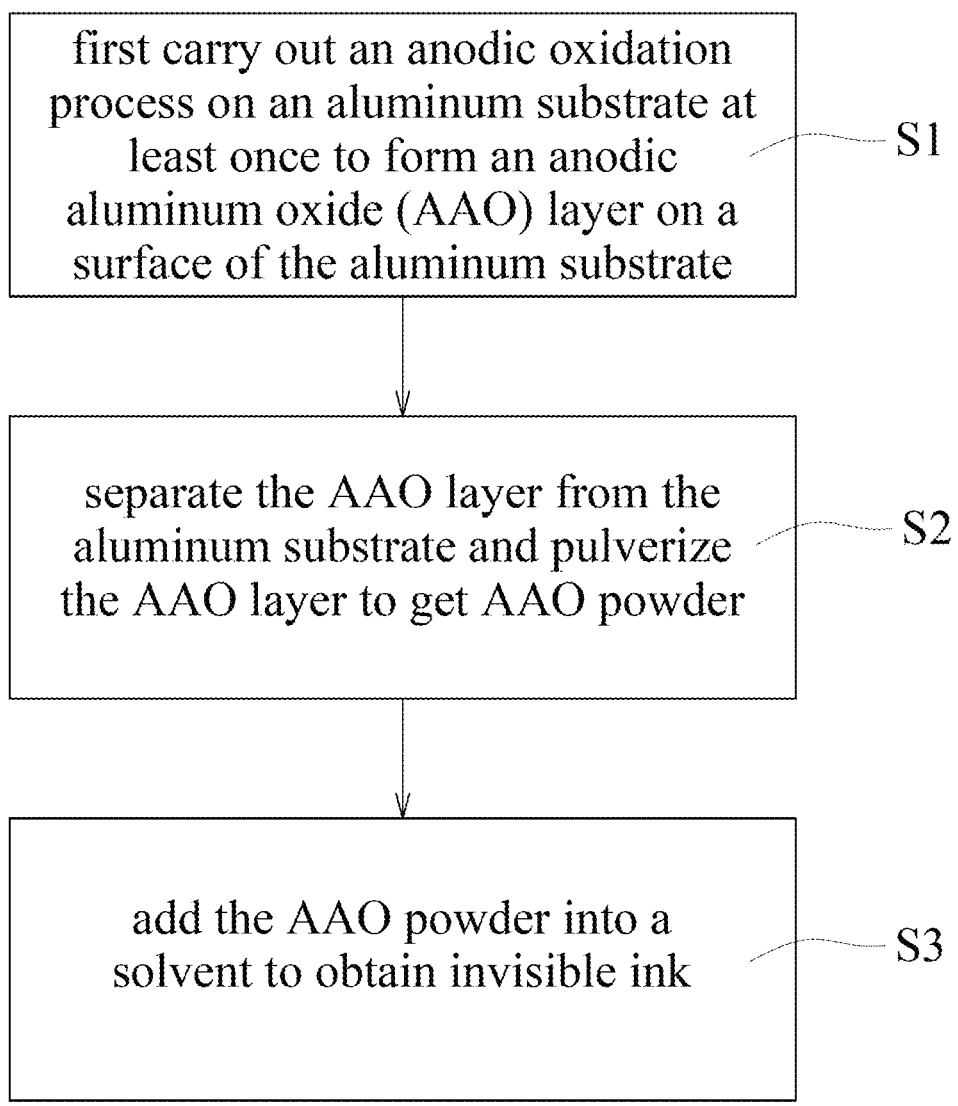
FIG. 1 is a block diagram showing steps of a method of making an invisible ink according to the present invention.

Refer to FIG. 1, a method of making an invisible ink according to the present invention includes the following steps. Step 1 (S1) first carry out an anodic oxidation process on an aluminum substrate at least once to form an anodic aluminum oxide (AAO) layer on a surface of the aluminum substrate. Step 2 (S2) separate the AAO layer from the aluminum substrate and pulverize the AAO layer to get AAO powder. Step 3 (S3) add the AAO powder into a solvent to obtain invisible ink. The solvent used consists of silicone oil and dispersants, or other liquids with the same effects.

In the anodic oxidation process of the step one (S1), the aluminum substrate is placed into an acidic solution and applied with a voltage ranging from 5 to 200 V (volt) at −3 to 35 degrees Celsius (° C.) for 3 min to 120 hours to form the AAO layer on the surface of the aluminum substrate. The acidic solution includes oxalic acid solution, phosphoric acid solution, sulfuric acid solution, and their combinations.

In the step two (S2) for separating the AAO layer from the aluminum substrate, the aluminum substrate with the AAO layer is placed into a mixed solution of perchloric acid and ethanol or in a perchloric acid aqueous solution and applied with a specific voltage for stripping the AAO layer from the aluminum substrate. The specific voltage is 1.1 to 1.5 times of the voltage used in the anodic oxidation process of the step one.

Please refer to the following embodiments.

Embodiment One

Place an aluminum substrate into a 0.1 to 1.5 M oxalic acid solution and then apply a voltage of 40 V at 25 degrees Celsius for 3 hours to carry out anodic oxidation on a surface of the aluminum substrate and form an anodic aluminum oxide (AAO) layer on the surface of the aluminum substrate.

Figure 2:
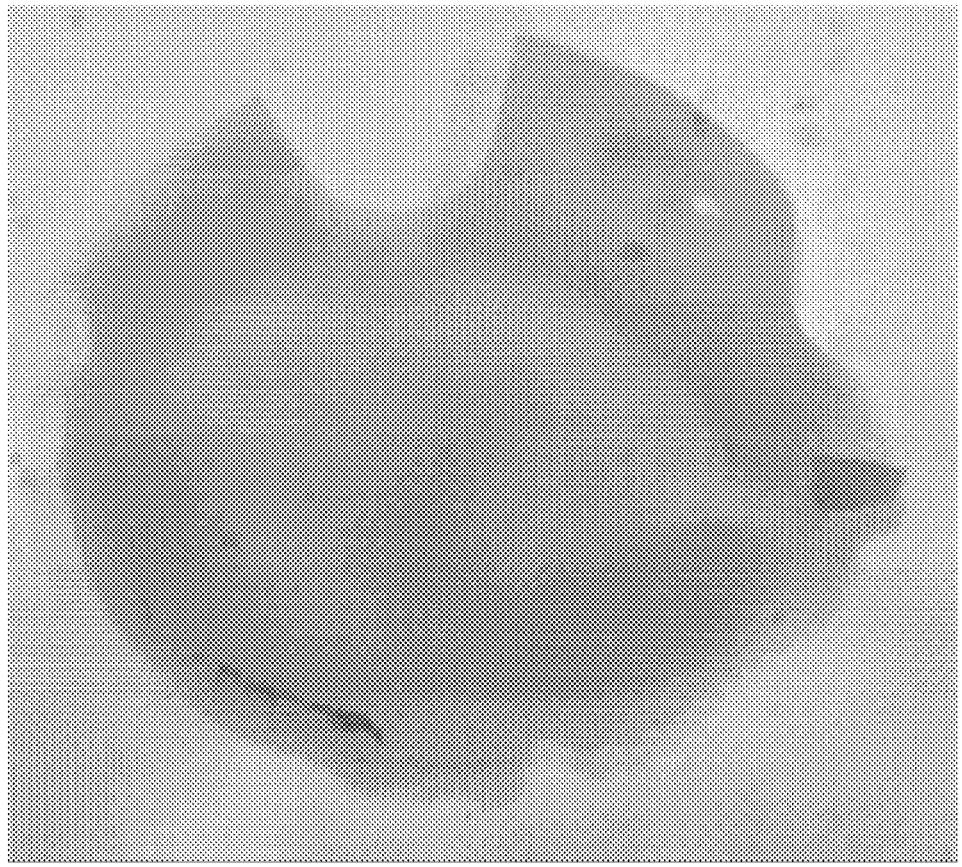
FIG. 2 is a photo of an anodic aluminum oxide (AAO) film stripped from an aluminum substrate according to the present invention.

Then immerse the aluminum substrate with the AAO layer into a mixed solution of perchloric acid and ethanol or in a perchloric acid aqueous solution and a volume ratio of perchloric acid to ethanol is 1:1. Next apply a voltage ranging from 50V to 80V to the aluminum substrate with the AAO layer for 20 to 40 seconds for stripping the AAO layer from the aluminum substrate to get an AAO film, as shown in FIG. 2. The specific voltage used for stripping the AAO layer used in this step is 1.1 to 1.5 times of the voltage used in the above step of anodic oxidation. For instance, the voltage used in the step of stripping the AAO layer is 1.1 to 1.5 V when the voltage used in the step of anodic oxidation is 1 V.

Next pulverize the stripped AAO film. For example, the AAO film is ground into AAO powder with a particle diameter of 0.01 to 5 micrometer (μm). Then the AAO powder is added into a transparent solvent and a dispersant is further added to get the invisible ink of the present invention. The dispersant is used to achieve even distribution of the AAO powder in the solvent and to prevent settling or clumping of the AAO powder.

Figure 3A:
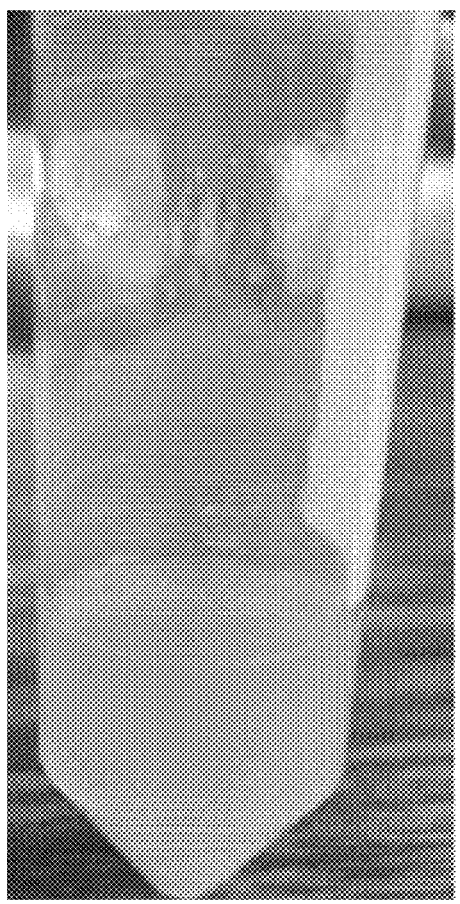
FIG. 3A and FIG. 3B are photos showing an invisible ink under visible light and under ultraviolet (UV) radiation observed according to the present invention.
Figure 3B:
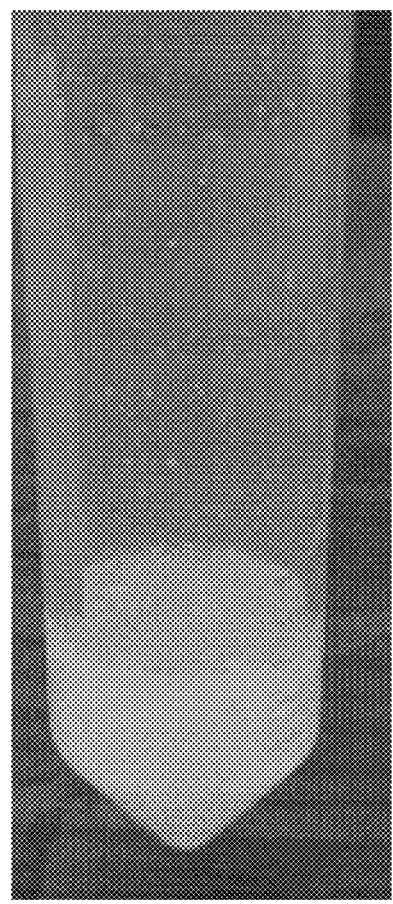

FIG. 3A and FIG. 3B show observation results of the invisible ink obtained under visible light and ultraviolet (UV) light radiation. Under visible light, the invisible ink according to the present invention is a translucent milky white liquid, as shown in FIG. 3A while the present invisible ink becomes highly fluorescent (shows strong fluorescence) under UV radiation, as shown in FIG. 3B.

Embodiment Two

Put an aluminum substrate into a 0.1 to 20 wt % phosphoric acid solution and then apply a voltage of 100 V at 25 degrees Celsius to form an AAO layer on a surface of the aluminum substrate.

Then immerse the aluminum substrate with the AAO layer into a mixed solution of perchloric acid and ethanol or in a perchloric acid aqueous solution and a volume ratio of perchloric acid to ethanol is 2:1. Laster apply a voltage ranging from 120V to 150V to the aluminum substrate with the AAO layer for 20 to 40 seconds for stripping the AAO layer from the aluminum substrate to get an AAO film. The specific voltage used for stripping the AAO layer used in this step is 1.1 to 1.5 times of the voltage used in the step of anodic oxidation. For instance, the voltage used in the step of stripping the AAO layer is 1.1 to 1.5 V when the voltage used in the step of anodic oxidation is 1 V.

Next pulverize the stripped AAO film. For example, the AAO film is ground into AAO powder with a particle diameter of 0.01 to 5 micrometer (μm). Then the AAO powder is added into a transparent solvent and a dispersant is further added to get the invisible ink of the present invention. The dispersant is used for even distribution of the AAO particles in the solvent and preventing the AAO powder from settling and clumping.

Embodiment Three

Put an aluminum substrate into a 0.001 M to 3M sulfuric acid solution and then apply a voltage of 30 V at 25 degrees Celsius to form an AAO layer on a surface of the aluminum substrate.

Then immerse the aluminum substrate with the AAO layer into a mixed solution of perchloric acid and ethanol or in a perchloric acid aqueous solution and a volume ratio of perchloric acid to ethanol is 2:1. Laster apply a voltage ranging from 33V to 45V to the aluminum substrate with the AAO layer for 20 to 40 seconds for stripping the AAO layer from the aluminum substrate to get an AAO film. The specific voltage used for stripping the AAO layer used in this step is 1.1 to 1.5 times of the voltage used in the step of anodic oxidation. For instance, the voltage used in the step of stripping the AAO layer is 1.1 to 1.5 V when the voltage used in the step of anodic oxidation is 1 V.

Next pulverize the stripped AAO film. For example, the AAO film is ground into AAO powder with a particle diameter of 0.01 to 5 micrometer (μm). Then the AAO powder is added into a transparent solvent and a dispersant is further added to get the invisible ink of the present invention. The dispersant is used for even distribution of the AAO particles in the solvent and preventing the AAO powder from settling and clumping.

The dissociation degree of acidic solution will affect the growth rate of AAO, too high concentration of acid may lead to too high growth rate and local high temperature to cause AAO burning, while too low concentration of acidic solution may not be able to form AAO, or it may take too long time to form AAO. In addition, different acids and concentrations will result in different photoluminescence intensities of AAO. Therefore, in order to produce high quality and high brightness fluorescent inks, the concentration of acid used to produce AAO must be strictly limited.

Compared with the techniques available now, the present invisible ink has the following advantages:
1. The AAO powder emits fluorescence due to its photoluminescence property, which is completely different from the conventional technique that makes the AAO to have color emission by structure colors.
2. The invisible ink according to the present invention is having stable photoluminescence property and not-easily decomposed. Thus the words and the figures which are written and drawn by the present invisible ink respectively are durable.
3. The AAO used in the present invisible ink is a kind of ceramic oxide instead of a metal. Thus the AAO powder is not necessarily pulverized into nanometer (nano) scale to have luminescence. The AAO powder will not aggregate together easily so that the invisible ink made will not have precipitate.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A method of fabricating an invisible ink comprising the steps of:
   step one: taking an aluminum substrate and carrying out anodic oxidation on the aluminum substrate at least once to form an anodic aluminum oxide layer on a surface of the aluminum substrate, wherein for the anodic oxidation, the aluminum substrate is placed into an acidic solution and applied with a voltage of 5 to 200 V (volt) at 25 degrees Celsius (C) for 3 min to 120 hours to form the anodic aluminum oxide layer on the surface of the aluminum substrate, and wherein the acidic solution is selected from the group consisting of: oxalic acid solution having a molar concentration ranging from 0.1 M to 1.5 M, phosphoric acid solution having a concentration ranging from 0.1 wt % to 20 wt %, sulfuric acid solution having a molar concentration ranging from 0.001 M to 3 M, and a combination thereof;
   step two: separating the anodic aluminum oxide layer from the aluminum substrate and pulverizing the separated anodic aluminum oxide layer to obtain anodic aluminum oxide powder, wherein in said step two, the aluminum substrate with the anodic aluminum oxide layer formed on the surface of said aluminum substrate is placed into a mixed solution of perchloric acid and ethanol or in a perchloric acid aqueous solution and is applied with a specific voltage for separating the anodic aluminum oxide layer from the aluminum substrate, wherein said specific voltage is 1.5 times of the voltage used in the anodic oxidation of said step one; and
   step three: obtaining the invisible ink by adding the anodic aluminum oxide powder into at least one solvent, wherein the anodic aluminum oxide powder has a particle diameter ranging from 1 to 5 micrometer ($\mu$m), and wherein said anodic aluminum oxide powder emits fluorescent radiation upon absorbance of ultraviolet light.

2. The method as claimed in claim 1, wherein in the anodic oxidation of the step one, the aluminum substrate is placed into a 0.1 to 1.5 M oxalic acid solution and applied with a voltage of 20 to 150 V.

3. The method as claimed in claim 1, wherein a weight ratio of the perchloric acid and the ethanol is 8:1 to 1:8 in the mixed solution of perchloric acid and ethanol.

4. The method as claimed in claim 1, wherein the weight ratio of the perchloric acid and the water is 8:1 to 1:8 in the perchloric acid aqueous solution.

5. The method as claimed in claim 1, wherein the solvent includes silicone oil and at least one dispersant.

6. The method as claimed in claim 1, wherein the aluminum substrate comprises high purity aluminum with purity higher than 99.9%, low purity aluminum with purity lower than 99.5%, 5052 aluminum alloy or 6061 aluminum alloy.

* * * * *